United States Patent [19]
Elder

[11] 3,791,113
[45] Feb. 12, 1974

[54] SEALS FOR AIR FILTERS

[76] Inventor: Robert Arnold Elder, 106 Edgewood Dr., Chateauguay Centre, Quebec, Canada

[22] Filed: Feb. 29, 1972

[21] Appl. No.: 230,422

[52] U.S. Cl............................ 55/473, 55/502, 98/39
[51] Int. Cl............................................. B01d 46/10
[58] Field of Search............ 55/502, 467, 470–473, 55/DIG. 18, 338; 98/39

[56] References Cited
UNITED STATES PATENTS

| | | | |
|---|---|---|---|
| 3,616,624 | 11/1971 | Marsh | 55/502 X |
| 3,470,679 | 10/1969 | Ramsey | 55/502 X |
| 2,700,362 | 1/1955 | Calling | 55/473 X |
| 3,273,323 | 9/1966 | Whitfield | 55/502 X |
| 3,301,167 | 1/1967 | Howard et al. | 55/467 UX |
| 2,146,071 | 2/1939 | Horvath | 55/473 X |
| 3,703,801 | 11/1972 | Deckas | 55/473 X |
| 3,494,112 | 2/1970 | Deckas | 55/502 X |
| 3,158,457 | 11/1964 | Whitfield | 55/473 X |

Primary Examiner—Frank W. Lutter
Assistant Examiner—Vincent Gifford

[57] ABSTRACT

An air filtering device for clean air particularly for systems for use in "clean rooms". One of the problems existing with devices of this nature has been that when small leaks develop at the bonded joints, contaminated air enters the clean area. The present invention seeks to overcome this disadvantage by causing any leaks, which do occur, to be away from the clean area rather than into it. The invention provides a device having an outer chamber with an air filter therein; sealing means between one face of the filter and the chamber; a plenum chamber and sealing means between the other face of the filter and the plenum chamber. A fan is operatively connected to the plenum chamber and is adapted to move air to be filtered across the filter through the faces thereof.

2 Claims, 5 Drawing Figures

SEALS FOR AIR FILTERS

BACKGROUND OF THE INVENTION

This invention relates to filter systems for clean air and particularly to systems for use in so called "clean rooms" such as for example in the assembly of micro miniaturized components for instruments in the like and in the performance of certain surgical techniques.

Such clean air filters have their edges sealed to an enclosure or duct. These seals frequently develop leaks at inadequately bonded joints or they sometimes develop leaks due to compression materials or the warping thereof. When such leaks are very small they may be difficult to detect yet they often provide an unwanted level of contamination in critical areas.

The present invention seeks to overcome the disadvantages of existing seals by arranging to cause leaks, which may be present in or around air filter seals to occur in a direction that will not be harmful.

SUMMARY OF THE INVENTION

Accordingly the present invention provides an air filtering device comprising an outer chamber; an air filter member in said chamber; air leak sealing outer means between one face of said filter member and said chamber; a plenum chamber; air leak sealing inner means between an other face of said air filter member and said plenum chamber; and a fan in said plenum chamber for moving air to be filtered across said filter through said faces thereof. Preferably any filtered air leakage is drawn back into the plenum chamber and recirculated.

In one embodiment of the invention the plenum chamber is, during operation maintained at a higher pressure then the outer chamber and the fan is upstream of the filter member.

In a second preferred embodiment the plenum chamber is, during operation, maintained in a lower pressure than the outer chamber and the fan is downstream of the filter.

The outer chamber may in certain embodiments of the invention be connected by means of a grill with a diffuser or distributing duct.

According to a further feature of the invention the outer chambers provide you with an air intake, which may have a prefilter therein, which is of an area smaller than that area necessary to provide full volume capacity delivery of the fan whereby to assist in maintaining the outer chamber at a lower pressure relative to the plenum chamber.

BRIEF DESCRIPTION OF THE DRAWINGS

The following is a description by way of example of certain embodiments of the invention reference being had to the accompanying drawings in which.

DESCRIPTION OF THE PREFERRED EMBODIMENTS

Figure 1:
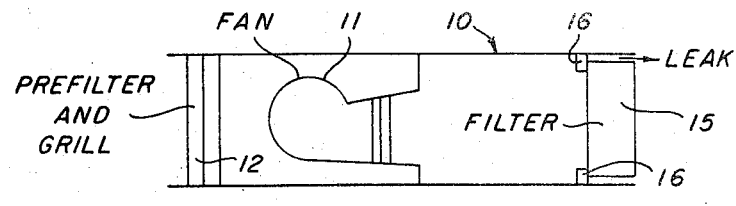
FIGS. 1 and 2 show details of prior art constructions.
Figure 2:
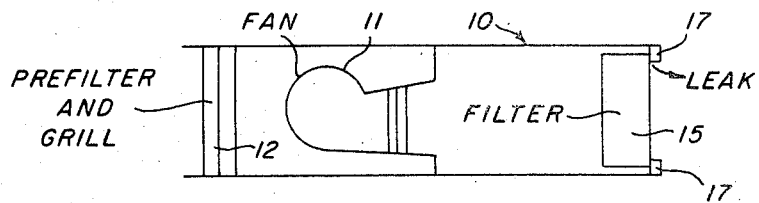

Referring now to the drawings in the prior art devices an outer casing 10 carried an air circulating fan 11 therein. The fan drew the air for circulation from the surrounding area through a grill and prefilter arrangement 12 and forced the air through a high efficiency particulate air filter into the clean room. Two methods of sealing the filter from the clean room were employed. In FIG. 1 the seals 16 were between the rear face of the filter and the casing 10 and in the known device as shown in FIG. 2 the seals 17 were provided between the outer face of the filter 15 and the casing 10.

Since the casing 10 behind the filter and downstream of the fan was at a relatively high pressure any leaks developing in the seals 16 or 17 would cause the leakage of dirty air about the filter and into the clean room.

Figure 3:
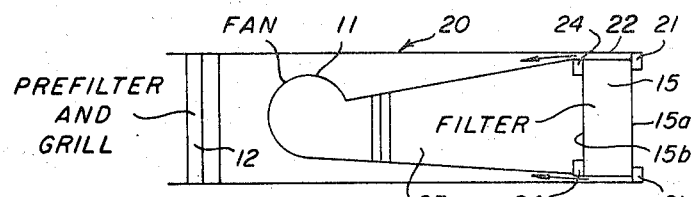
FIG. 3 is a diagrammatic representation of one embodiment in accordance with the invention.
Figure 4:
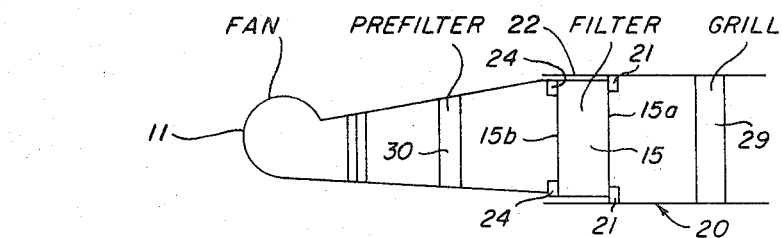
FIG. 4 is an embodiment of the invention similar to that shown in FIG. 3 but with the outer chamber terminating adjacently the outer seals.
Figure 5:
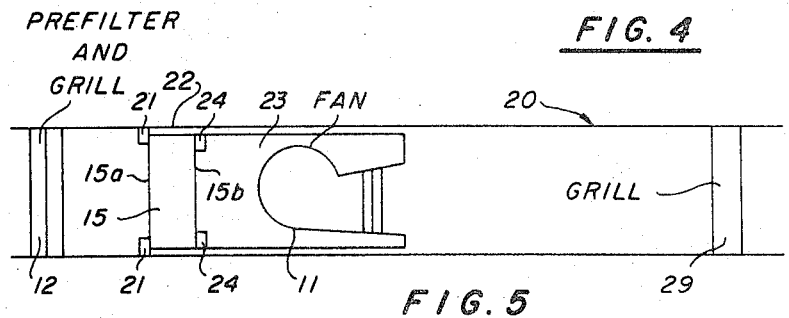
FIG. 5 is a diagrammatic representation of a third embodiment of the invention.

Referring now to the devices in accordance with the invention as illustrated in FIGS. 3, 4 and 5 an outer chamber 20 has a high efficiency particulate air filter 15 therein. Outer seals 21 seal one face 15a of the filter with the chamber 20. A plenum chamber 23 is sealed with seals 24 to the other face 15b of the filter. An intermediate area 22 is formed in the space between the seals 21, 24. A fan 11, in the case of the device according to FIGS. 3 and 4, forces air under pressure through the filter 15, and in the embodiment according to FIG. 5, draws air through the filter 15.

In FIG. 3 it will be observed that the outer chamber 20 is provided with an air intake covered with a prefilter 12. The air intake is preferably of an area such that it confines the air intake to the fan to 90 percent of the fan delivery capacity. This ensures that the outer chamber 20 is maintained at a somewhat negative pressure. The air taken from the outer chamber 20 by the fan 11 is then forced under pressure into the plenum chamber 23 and out through the filter 15 into the clean room. Any tendency for the seals 21 to leak causes air to be drawn from the clean room into the intermediate area 22 which air is then recirculated by the fan 11 through the filter 15 into the clean room. Similarly any tendency of the inner seals 24 to leak results in the dirty air from the plenum being recirculated through the intermediate area the outer chamber 20 the fan 11, the plenum 23 and the filter 15 to the clean room.

In the embodiment shown in FIG. 4 the filter 15 is connected with a diffuser or duct which acts as the outer chamber 20 and a prefilter 30 may be conveniently provided in the plenum 23 between the fan 11 and the filter 15. Again since the pressures behind the seals 21 and 24 are negative with respect to the pressure in the diffuser or duct any tendency of the seal 21 to leak results in a leakage from the diffuser or duct outwardly thereof.

In the embodiment as seen in FIG. 5 the fan instead of being arranged upstream of the filter 15 as it was in the embodiments according to FIGS. 3 and 4, is arranged downstream. Air for circulation is drawn through an air intake provided with a prefilter 12 and is drawn through the filter and delivered outwardly into the diffuser or duct through a grill 29. Since the plenum chamber in this instance is at a negative pressure with respect to the outer chamber any tendency for the seals 21 to leak will be to the upstream face 15a of the filter 15.

It will be observed that by arranging a plenum chamber and sealing it to the filter member in the fashion according to the invention any tendency for seals of the filter member to leak is in a direction such that contaminated air is prohibited from entering the clean room.

I claim:

1. An air filtering device comprising an outer casing defining an outer chamber, a clean air delivery aperture in said casing, an air filter means having upstream and downstream faces, substantially completely closing said delivery aperture; an outer air leak sealing means between the downstream side of said air filter means and said outer casing closing said delivery aperture; a plenum chamber within said outer chamber; inner air leak sealing means between the upstream face of the filter means and said plenum chamber; a face within said outer chamber operatively connected to said plenum chamber and upstream of said filter means; an intermediate area within said outer casing sealed at one end by said outer sealing means and extending within the outer casing to the area of the inner air leak sealing means and communicating within said outer casing with a suction side of said fan; said fan maintaining, during operation, a positive pressure in said plenum chamber relative to said outer chamber including said intermediate area, whereby air leakage through said inner sealing means is drawn by said fan from said outer chamber for recirculation, and the relatively negative pressure in the outer chamber deters air leakage through said outer sealing means to the downstream side of the filter means.

2. A device as claimed in claim 1 in which the outer chamber is provided with an air intake of area smaller than that necessary to provide full volume capacity delivery of the fan whereby to assist in maintaining the outer chamber at a lower pressure relative to the plenum chamber.

* * * * *